US012801090B2

(12) United States Patent
Tortora

(10) Patent No.: US 12,801,090 B2
(45) Date of Patent: Nov. 17, 2026

(54) WATCH PROVIDED WITH A TRANSPARENT AND/OR TRANSLUCENT DECORATIVE STRUCTURE, IN PARTICULAR A PLIQUE-À-JOUR ENAMEL

(71) Applicant: The Swatch Group Research and Development Ltd, Marin (CH)

(72) Inventor: Pierpasquale Tortora, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 385 days.

(21) Appl. No.: 18/428,782

(22) Filed: Jan. 31, 2024

(65) Prior Publication Data

US 2024/0288828 A1 Aug. 29, 2024

(30) Foreign Application Priority Data

Feb. 24, 2023 (EP) .................................... 23158473

(51) Int. Cl.
*G04B 45/00* (2006.01)
*G04B 19/12* (2006.01)
*G04B 19/30* (2006.01)

(52) U.S. Cl.
CPC ......... *G04B 45/0015* (2013.01); *G04B 19/12* (2013.01); *G04B 19/30* (2013.01)

(58) Field of Classification Search
CPC .... G04B 45/0015; G04B 19/12; G04B 19/30; G04B 47/04; G04B 19/10; G04B 45/0076
See application file for complete search history.

(56) References Cited

U.S. PATENT DOCUMENTS

| | | | | | |
|---|---|---|---|---|---|
| 4,118,924 | A | 10/1978 | Foellner | | |
| 5,566,137 | A * | 10/1996 | Chevroulet | G04B 39/008 | 368/239 |
| 5,734,627 | A * | 3/1998 | Sy | G04B 19/30 | 368/227 |
| 2009/0109801 | A1 * | 4/2009 | Winkler | G04G 9/0041 | 368/227 |

(Continued)

FOREIGN PATENT DOCUMENTS

| | | | | | |
|---|---|---|---|---|---|
| CH | 702 419 | A2 | 6/2011 | |
| EP | 3796103 | A1 * | 3/2021 | F21V 33/0004 |
| FR | 786870 | A | 9/1935 | |

OTHER PUBLICATIONS

European Search Report for EP 23 15 8473 dated Jul. 14, 2023.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A watch (2) includes: a case (4); a movement (6) incorporated in the case; a lower glass (10) forming at least in part the back (12); a decorative structure (16) visible axially from the side of the front face (20) of the watch and comprising at least one transparent and/or translucent portion (**16*a*) which is visible axially through the lower glass; a light source (26): and a mirror (28). The light source emit light towards the mirror arranged below the light source and below a rear surface (18) of the decorative structure, the mirror receiving most of the light energy emitted by the light source and reflecting the light from the light source so that the reflected light is incident on the rear surface of the decorative structure in at least one area (18*a***) defined by the at least one transparent and/or translucent portion.

18 Claims, 3 Drawing Sheets

(56) References Cited

U.S. PATENT DOCUMENTS

| | | | | |
|---|---|---|---|---|
| 2012/0120776 | A1* | 5/2012 | Fleury | G04B 19/30 368/205 |
| 2014/0160904 | A1* | 6/2014 | Decoux | G04G 9/0041 368/226 |
| 2019/0121197 | A1* | 4/2019 | Jeon | G02B 6/0031 |

* cited by examiner

WATCH PROVIDED WITH A TRANSPARENT AND/OR TRANSLUCENT DECORATIVE STRUCTURE, IN PARTICULAR A PLIQUE-À-JOUR ENAMEL

CROSS REFERENCE TO RELATED APPLICATION

This application claims priority to European Patent Application No. 23158473.1 filed Feb. 24, 2023, the entire contents of which are incorporated herein by reference.

TECHNICAL FIELD OF THE INVENTION

This invention relates to a watch provided with a transparent and/or translucent decorative structure.

More particularly, the invention relates to a watch provided with a transparent or translucent enamel decoration, in particular of the plique-à-jour enamel type, visible from the front/upper face of this watch.

TECHNOLOGICAL BACKGROUND

In the case of transparent or translucent enamels arranged in openings of an initially openwork structure, like stained-glass but for relatively small dimensions, we talk about plique-à-jour enamel, i.e. an enamel object made according to the plique-à-jour technique. This technique is similar to stained-glass, in that transparent or translucent enamels, often at least partially coloured in various shades, are deposited in various openings formed by a bottomless partitioned structure, i.e. the partitioned structure has through openings. After firing the deposited enamels, an object is obtained with a partitioned structure, generally metallic, the various openings of which are filled with transparent or translucent enamels through which light can pass at least in part.

Watches equipped with a plique-à-jour enamel decoration are known, in particular watches having an upper glass, a lower glass and a movement of reduced dimensions compared to these two glasses. At the periphery of the movement a flat decorative structure made of plique-à-jour enamel is arranged, this structure being arranged on the side of the upper glass so as to be axially at least partially visible through the upper glass and the lower glass. Thus, when looking through the two glasses and the decorative structure, wearing the watch so as to receive ambient light on the rear face of the decorative structure, relative to the glass through which the observer looks at this decorative structure, the various enamels can be observed in transparency, thus being backlit by the ambient light. However, when the watch is worn on the wearer's wrist, no ambient light penetrates through the lower glass (the glass at the back of the case). Hence, the decorative plique-à-jour enamel structure is not backlit, so that the full benefit of its transparency and the brilliance of the enamels cannot be enjoyed.

SUMMARY OF THE INVENTION

The main purpose of the present invention is to solve the above-mentioned problem. In addition, the invention aims to provide a watch of the type described above which will enable the plique-à-jour enamel structure to be highlighted in a dimly lit space and even at night.

Thus, the invention relates to a watch comprising:

a case,—a movement incorporated in the case, a lower glass at least partly forming the back of the box and generally extending in a general plane perpendicular to a central axis of the box, a decorative structure visible axially from the front face of the watch and comprising at least one transparent and/or translucent portion visible axially through the lower glass.

According to the invention, the watch further comprises a light source and a mirror, the light source being arranged so as to emit substantially towards said general plane, the mirror being arranged below the light source and below a rear surface of the decorative structure. The light source and the mirror are arranged so that this mirror could receive most of the light energy emitted by the light source, when the latter is active, and could reflect the light originating from this light source so that this reflected light is finally at least partially incident on the rear surface of the decorative structure in at least one area defined by said at least one transparent and/or translucent portion and then passes through said at least one transparent and/or translucent portion.

Thanks to the features of the invention, the decorative structure that is at least partially transparent and/or translucent, in particular a plique-à-jour enamel structure, is still highlighted when the light source inside the watch is deactivated, in particular by the fact that an observer, when not wearing the watch on his or her wrist, can look at said at least one transparent and/or translucent portion, from the side of the front face of the watch, like a stained-glass window, by positioning the watch so that ambient light arrives on the front face of the watch, can look at said at least one transparent and/or translucent portion, from the side of the front face of the watch, like a stained glass window by positioning the watch so that ambient light reaches the rear surface of said at least one transparent or translucent portion of the decorative structure through the lower glass arranged in the back of the case. Indeed, the ambient light incident axially on the decorative structure on the front face of the watch can pass through this watch and then emerge through the rear face of the watch through the lower glass, and vice versa. In addition, the decorative structure, in particular said at least one transparent and/or translucent portion, can be backlit by the light source provided when the watch is worn on the wrist of a user and/or when the ambient light is not sufficient to confer a luminous glow on said at least one transparent and/or translucent portion, in particular in transparency. The term 'backlit' is understood to mean backlighting of the decorative structure, at least in the region defined by said at least one transparent and/or translucent portion, which passes through said at least one transparent and/or translucent portion and emerges from the front face of the watch.

In a main embodiment, the mirror is arranged so as to reflect light originating from the light source directly towards said at least one area of the rear surface of the decorative structure.

In an advantageous embodiment, the mirror is of the 'free form' type and formed by a reflective surface which is configured so that light reflected by the mirror and incident on said at least one area of the rear surface of the decorative structure is substantially uniform.

According to a preferred variant, the reflective surface of the mirror is configured so that the light reflected by said mirror is mostly incident on said at least one area of the rear surface of the decorative structure.

In a particular embodiment, said mirror is a first mirror arranged, relative to said at least one transparent and/or translucent portion of the decorative structure, radially on the movement side. The watch further comprises at least one second mirror which is arranged radially on the side opposite to that of the first mirror relative to said at least one transparent and/or translucent portion of the decorative structure.

According to an advantageous variant, said at least one second mirror is formed by a part incorporated into the case or by a portion of this case, i.e. the internal surface of such a part or portion defines the reflective surface of the second mirror, and arranged, relative to said central axis, radially beyond the edge of a bearing surface of the back on which the lower glass rests.

BRIEF DESCRIPTION OF THE FIGURES

The invention will be described in greater detail below with the aid of the appended drawings, given as non-limiting examples, wherein.

DETAILED DESCRIPTION OF THE INVENTION

Figure 1:
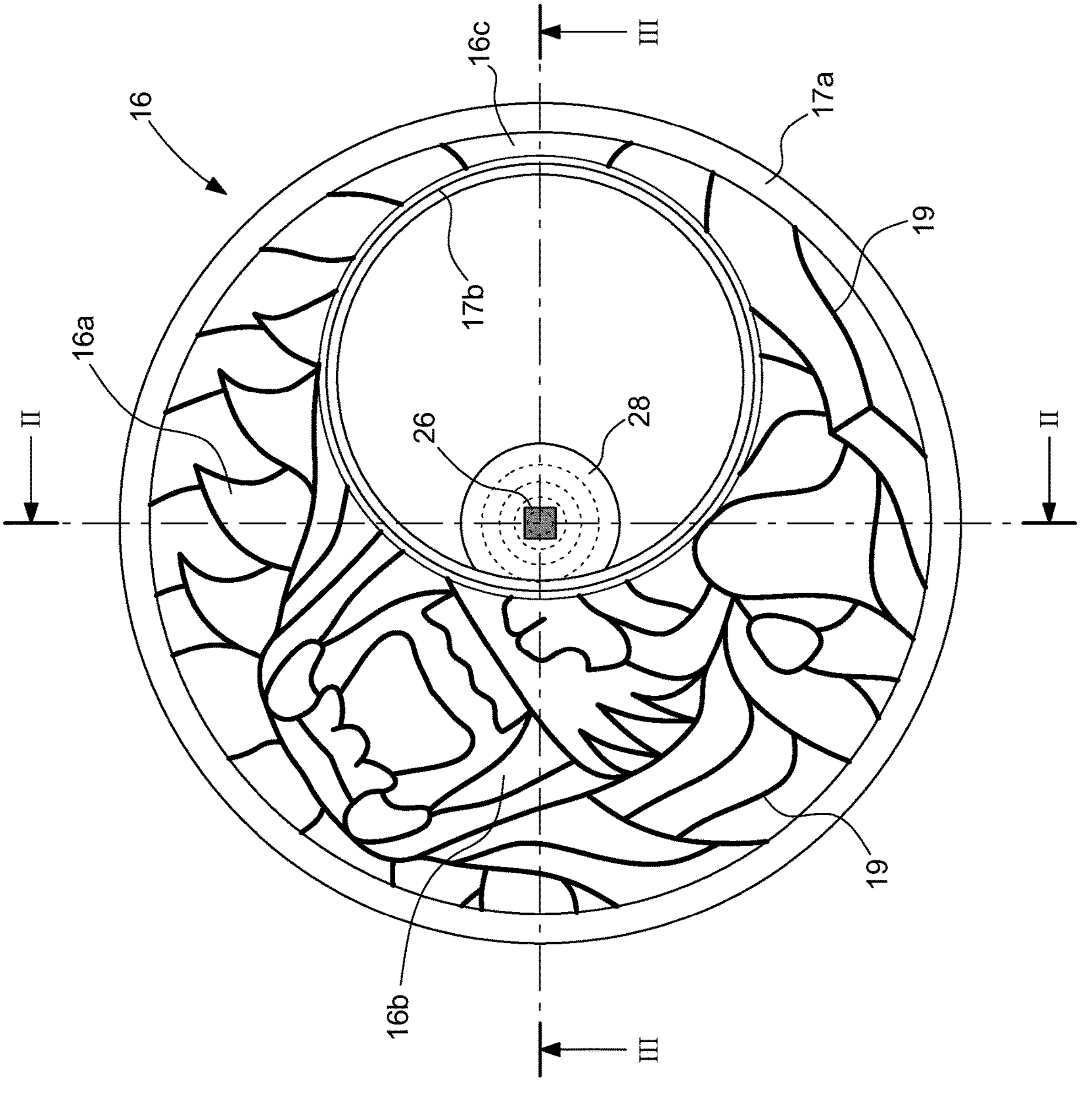
FIG. 1 shows, according to plan view, part of a first embodiment of a watch according to the invention.

With reference to FIGS. 1 to 4, a first embodiment of a watch according to the invention will be described below.

Watch 2 comprises:

a case 4, a movement 6 incorporated in the case, a lower glass 10 forming at least in part the back 12 of the case and generally extending in a general plane 11 perpendicular to a central axis 14 of the case, and—a decorative structure 16 which is visible axially on the side of the front face 20 of the watch 2 and comprising transparent and/or translucent portions 16*a*, 16*b* visible axially through the lower glass 10.

Note that only two transparent and/or translucent portions 16*a*, 16*b* have a reference, but it is obvious that they represent all the transparent and/or translucent portions of the decorative structure. In the variant shown in the figures, the decorative structure 16 forms a plique-à-jour enamel decoration, similar to a stained-glass window but made using a technique appropriate for watch dimensions. Thus, external light (in particular ambient light) incident axially on the lower glass forming the back 12 of the case can pass axially through the watch and then emerge through the front face 20 of this watch. The decorative structure 16 comprises an external annular portion 17*a* forming a support structure which is fastened to the case 4 or held by portions of the case or by a part secured to the case. In the illustrated variant, the annular portion 17*a* is arranged between a first part 4*a*, forming the back 12 and a middle, and a part 4*b* forming a bezel. The decorative structure 16 also comprises an internal annular portion 17*b* which forms a support (a kind of fitting circle) for the movement 6. In the upper portion of the internal annular portion is arranged a dial 32 above which is located an analogue time display 34. In a particular variant, the dial superimposed on the movement is formed by a portion of the decorative structure. Various metal walls 19 are provided between the two annular portions 17*a*, 17*b*, forming openings in a perforated metal part forming the decorative structure. Enamelled portions of various colours and/or shades, at least some of which are transparent and/or translucent, are arranged in these openings of various shapes, so as to obtain a certain abstract motif or representing at least one object and/or living being.

Since the movement 6 is off-centre relative to the central axis 14 of the case, the annular portions 17*a*, 17*b* have respective portions which are close to each other and which are materially connected by a stiffening portion above which is provided at least one cavity filled with an enamel 16*c*. This enamel 16*c* forms part of the decoration presented by the decorative structure 16, without however participating in the plique-à-jour enamel, although it may also be transparent or translucent, since it cannot be observed in transparency because of the stiffening portion.

In the illustrated variants, the transparent and/or translucent portions 16*a*, 16*b* are arranged at the periphery of the movement 6, so that the plique-à-jour enamel can be observed entirely without elements superimposing with the rear surface 18 of the decorative structure 16 in the areas 18*a*, 18*b* of this rear surface defined respectively by the transparent and/or translucent portions. However, in another variant, in the case of an apertured movement, in particular a skeleton-type mechanical movement, at least one transparent and/or translucent portion of the decorative structure may be provided above openings passing through the movement. Various variants may be considered.

The watch 2 comprises an upper glass 36 arranged on the side of the front face 20 of this watch and covering the movement 6 and the decorative structure 16, with the exception of the external annular portion 17*a*, which may, in another variant, be a part distinct from the decorative structure. More specifically, the glass 36 is a conventional analogue display watch glass which covers the dial 32 and the analogue display 34 and, in addition in the context of the embodiment of the invention described herein, the enamelled portions, more generally the decorative portions which include the transparent and/or translucent portions 16*a*, 16*b* of the decorative structure which is peripheral to the 'movement and dial' assembly. In the other aforementioned variant, the external annular portion forms a rigid circle in which the decorative structure is arranged and fastened, in particular by gluing, by driving in, or by screws.

According to the invention, the watch 2 further comprises a light source 26 and a mirror 28, the light source being arranged so as to emit light substantially in the direction of the general plane 11 defined by the lower glass 10, the mirror 28 being arranged below the light source 26 and below the rear surface 18 of the decorative structure 16. The light source and the mirror are arranged so that this mirror could receive most of the light energy emitted by the light source, when the latter is active, and could reflect the light originating from this light source so that this reflected light 50 is finally at least partially incident on the rear surface 18 of the decorative structure, in the areas 18*a*, 18*b* of this rear surface defined by the transparent and/or translucent portions 16*a*, 16*b*, and then passes through these transparent and/or translucent portions to emerge on the front side of the watch through the upper glass 36.

In a general variant, the mirror 28 is fastened directly or indirectly to the lower glass 10. In particular, this mirror is glued to the internal surface of the lower glass forming the back 12 of the case 4.

Thanks to the artificial lighting device incorporated in the watch according to the invention, the transparent and/or translucent portions of the decorative structure 16 can be backlit by light generated by the light source 26 and reflected by the mirror 28.

The light source 26 is preferably formed by at least one light-emitting diode (LED). This light source is powered by a battery, which can be recharged in particular by contactless means through the lower glass 10. Such a battery is incorporated in the movement 6 or arranged, for example, between this movement and the lower glass in a region 38 superimposed on the movement which does not pose any problem for the intended backlighting of the decorative structure 16. A flat and relatively thin battery covering all or part of the movement and arranged against the rear face of this movement may be considered. Alternatively, a specific housing for a battery may be provided in the movement. The light source 26 is preferably supported by the horological movement on the side of its rear face. Thus, the light source 26 is axially superimposed on the movement 6, as in the illustrated variants. In particular, the electronic device comprising the light source is fastened to the watch movement.

In advantageous variants, the movement is covered, on the side of the front face 20 of the watch, by an opaque dial or by an opaque portion of the decorative structure and/or, on the side of the lower glass 10, by an opaque structure or layer, in particular a metal plate 40 having a reflective lower surface. Note that in the latter case, the light source may be supported by the metal plate or this plate has an opening in the region of the light source, located above this plate, so that the light emitted by this source can propagate towards the mirror 28. In these advantageous variants, the mirror 28 is at least for the most part, and preferably entirely, axially superimposed on the assembly formed by the movement 6 and the annular portion 17*b* which surrounds and supports it. More generally, the mirror is at least for the most part, preferably entirely, covered axially, on the front face side of the watch, by at least one opaque portion, so that it is not visible from the front face to an observer. However, in another variant, the mirror is at least partly visible from the front face of the watch through the upper glass 36. The mirror 28 is a reflective part which does not a priori pose an aesthetic problem when observed from the front face.

In one main variant, the light source 26 has a main emission axis that is parallel to said central axis 14. In the illustrated variant, the main emission axis of the light source is coincident with the central axis 14 of the case of the watch. In this main variant, the mirror 28 is axially aligned with the light source.

The light source can advantageously be activated by a user by means of a control device accessible from outside the case 4 and/or automatically as a function of various events related to the movement or to a complementary mechanism that triggers an animation. Other variants are also possible. The main purpose of the artificial lighting inside the watch 2 is to highlight the decorative structure 16, in particular to confer brightness thereon comparable to relatively intense ambient light that would pass axially through the watch via the transparent and/or translucent portions of the decorative structure, when the watch is worn on the wrist and in particular in the case of low ambient light, and even at night.

In an advantageous variant, the mirror 28 is arranged so as to reflect light originating from the light source 26 directly towards at least one area, among the respective areas defined by the transparent and/or translucent portions, of the rear surface 18 of the decorative structure 16. In other words, at least part 50*a* of the reflected light 50 reaches said at least one area directly without any other reflection (reflection on a polished surface or diffusion on a reflective structure with a certain roughness, for example a semi-matt surface). In the variant shown, a part 50*a* of the light 50 reflected by the mirror 28 is directly incident on the rear surface of the decorative structure 16 and another part 50*b* of this reflected light 50 undergoes other reflections/diffusions on other reflective surfaces before at least partially reaching this rear surface.

In the illustrated variant of the first embodiment, a light guide is created between the movement 6 and a region 10*b* of the lower glass 10 located opposite this movement. In this region 10*b* of the lower glass, a metal layer 42 is deposited, preferably over the internal surface of this glass, which forms a second secondary mirror, while the reflective plate 40 arranged under the movement forms a first secondary mirror. More generally, in this variant, a reflective structure, located at the rear of the movement or forming at least a rear portion of this movement, is arranged at the periphery of the light source 26. In particular, the mirror 28 is glued or welded to the metal layer 42. This metal layer renders the region 10*b* of the lower glass 10 opaque, thereby masking the mirror 28 and the light source 26 located above this mirror, as well as at least partially and advantageously the entire movement 6 from an axial viewpoint. On the other hand, the region 10*a* of the lower glass 10, which is axially opposite the transparent and/or translucent portions 16*a*, 16*b* of the decorative structure 16, is transparent. Preferably, the first secondary mirror 40 has a slightly frosted surface to promote a certain diffusion of the light 50*b*, i.e. at angles which are not symmetrical relative to the axial direction, in particular smaller angles so that a maximum of light energy from the part 50*b* of the reflected light 50 is incident on the second secondary mirror 42 which reflects the light towards the rear surface 18 of the decorative structure 16.

Figure 2:
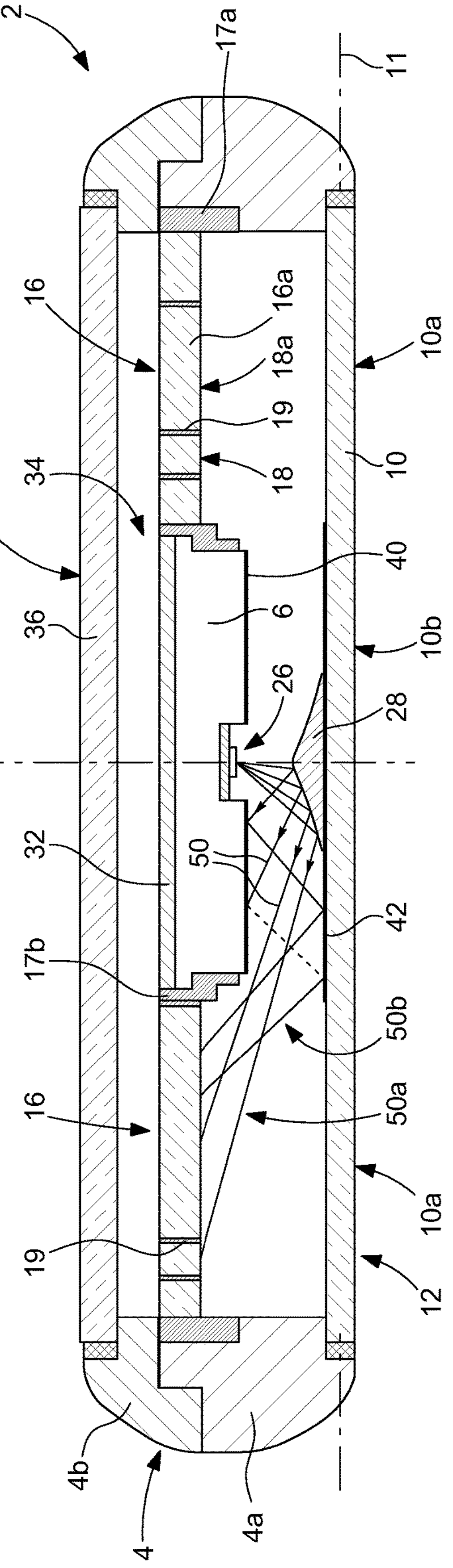
FIG. 2 is a first axial sectional view, along the line II-II of FIG. 1, of the watch of the first embodiment.
Figure 3:
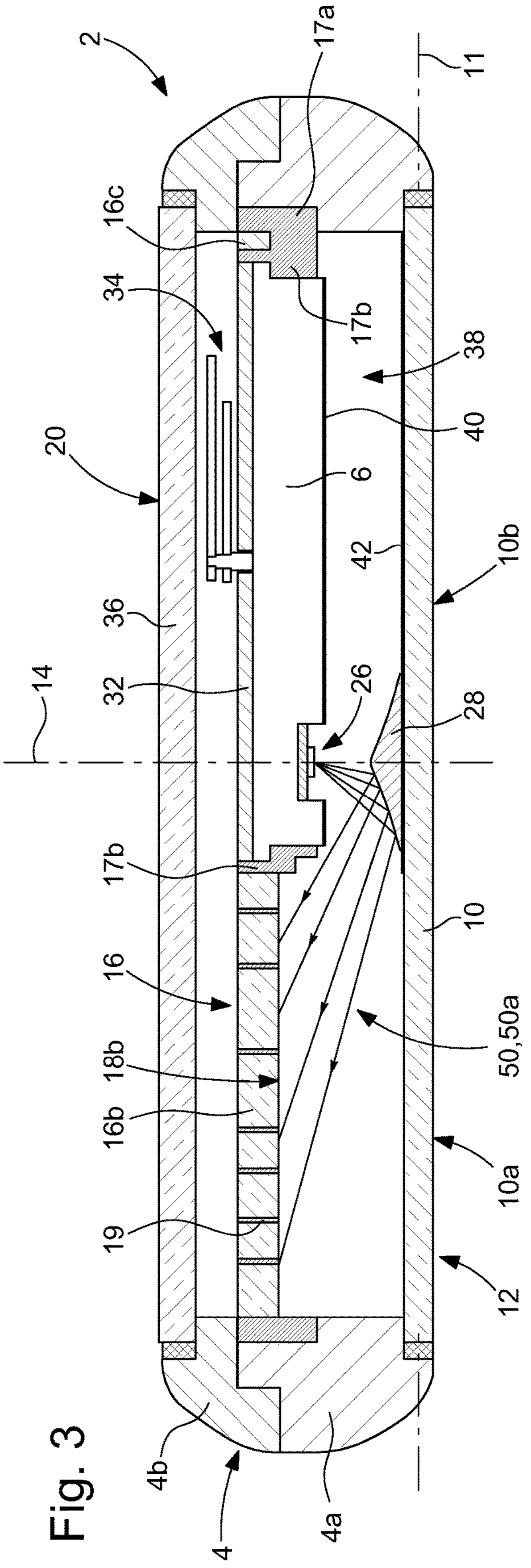
FIG. 3 is a second axial sectional view, along the line III-III of FIG. 1, of the watch shown in FIGS. 1 and 2.

Preferably, the mirror 28 is of the 'free form' type and formed by a reflective surface which is configured so that the light reflected 50 by this mirror and incident directly on the areas 18*a*, 18*b* of the rear surface 18 of the decorative structure 16 is substantially uniform. It should be noted that, in general, the distribution of light energy by the light source 26 is substantially Gaussian. Thus, to obtain a uniform distribution of the light energy directly incident on the decorative structure after being reflected by the mirror 28, it is understood that there cannot be a parallel reflection of the light rays by the mirror. This 'free-form' mirror can advantageously take account of the presence of the movement 6 and the specific shape of the decorative structure arranged at its periphery to concentrate the illumination on the rear face 18 of the decorative structure and largely avoid the incidence of the reflected rays on the rear face of the movement 6 or on the first secondary mirror 40, the latter then being less useful or even superfluous. However, as can be seen in FIG. 2, in order to be able to reach areas of the rear surface 18 of the decorative structure located close to the movement 6, and therefore to the internal annular portion 17*b*, without other considerations or other specific arrangements, in particular as provided for in the second embodiment to be described below, the presence of the secondary mirrors 40 and 42 are useful and it is therefore advantageous to provide for a certain amount of the light energy to be reflected by the mirror 28 in the direction of the first secondary mirror 40. These two secondary mirrors and thus the light guide they form together can be taken into account when determining the free shape of the mirror 28.

The reflective surface of a 'free-form' mirror can be calculated by means of software designed for this purpose. Such software allows relatively complex reflective surfaces to be configured on the basis of data characterising the light source and its positioning, the general positioning of the mirror relative to a geometric plane defined by a material surface to be illuminated, in particular the lower surface of the decorative structure, and the desired light distribution in the geometric plane by indicating the desired intensities in each elementary area of a plurality of elementary areas forming a matrix. The dimensions of these elementary areas define a certain resolution of the calculation. To increase this resolution, the size of the elementary areas can be reduced so that they are very small and visually almost punctual. It is possible to advantageously use, for example, the 'Advanced Design Module' software, in particular the 'Ray-tracing LightTools' tool, among the 'LightTools Modules' software from the company Synopsis®, this tool being designed in particular to provide free-form reflective surfaces as a function of various data relating to a specific desired illumination.

Each reflective surface may be of the 'single surface' type or of the 'segmented surface' type, the latter comprising a plurality of distinct surfaces which are combined into one single illumination device to obtain the desired result. In particular, two distinct surfaces are delimited by an edge between them. The possibilities for specific illumination using one single small light source are various and numerous.

Figure 4:
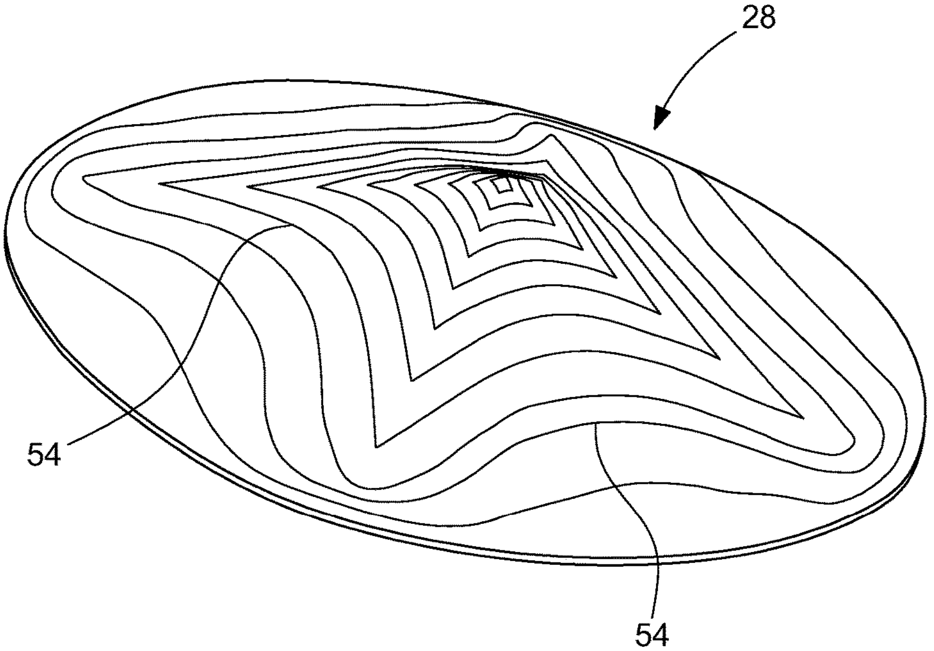
FIG. 4 is a perspective view of a 'free-form' type mirror incorporated in the watch of the first embodiment.

According to a particular variant, the reflective surface of the mirror 28, of the 'free-form' type, is configured as a function of a non-circular emission surface of the light source 26, which is provided with a square shape, projected in a plane orthogonal to the central axis 14, in the illustrated example. For example, the shape of the reflective surface is as shown in FIG. 4, which shows the mirror 28 in perspective with contour lines 54.

In a preferred variant, the 'free-form' mirror 28 is configured so that the reflected light 50 is ultimately mostly incident on the areas of the rear surface 18 of the decorative structure 16 that are defined respectively by the transparent or translucent portions of this decorative structure.

Figure 5:
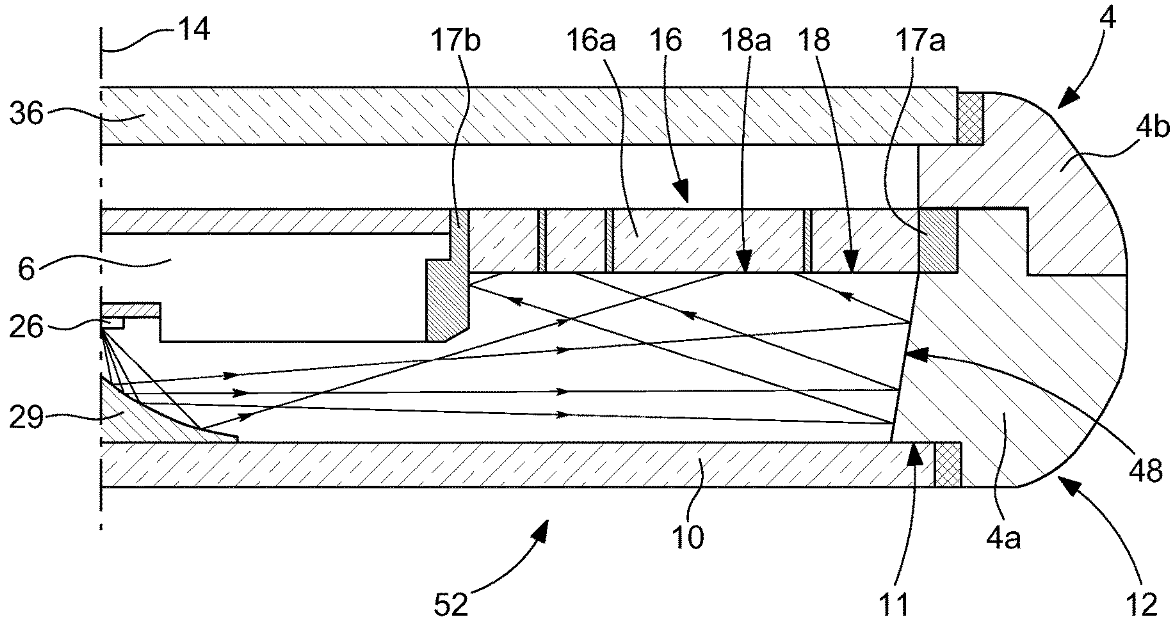
FIG. 5 is a partial sectional view, along a sectional plane identical to that of FIG. 2, of a second embodiment of a watch according to the invention.

With reference to FIG. 5, a second embodiment of the invention is described below. The elements bearing a reference already described in connection with the first embodiment are identical or similar to the corresponding elements described before and will not be described herein again in details. The second embodiment differs from the first embodiment essentially by having a first mirror 29 defining a reflective surface with a slightly different shape to the mirror 28 of the first embodiment and by arranging a second mirror 48 on the opposite side to the first mirror 29 relative to the decorative structure 16. The first mirror 29 is arranged, relative to the transparent and/or translucent portions 16*a* of the decorative structure 16, on the side of the movement 6. The second mirror 48 is arranged on the side opposite to that of the first mirror 29 relative to the transparent and/or translucent portions of the decorative structure 16. In the illustrated variant, the second mirror 48 is defined by a polished internal surface of a metal portion of the case forming the back and a middle. In other variants where the back is a portion distinct from the middle, the second mirror is formed by at least one internal surface of the middle and/or the back. In another variant, the second mirror is formed by a specific part which is incorporated in the case and arranged, relative to the central axis 14, radially beyond the edge of a bearing surface 11 of the back 12 on which the lower glass 10 rests.

In the illustrated particular variant, the mirror 48 has a frustoconical shape with an oblique linear profile, the frustoconical shape being flared upwards. The mirror 48 advantageously extends over most, preferably almost the entire height of the case between the lower glass 10 and the decorative structure 16. In other variants, the profile may be different, in particular spherical or parabolic. In optimised variants, the second mirror 48 is also a 'free-form' type mirror. The first mirror 29 is configured so that at least a significant part of the light energy it reflects propagates towards the second mirror 48, located at the periphery of the decorative structure 16. The second mirror 48 is advantageously configured so that incident light originating from the first mirror 29 is reflected so as to directly reach at least one region of the areas of the rear surface 18 defined by the transparent and/or translucent portions of the decorative structure which does not directly receive light reflected by the first mirror 29. This makes it possible to evenly illuminate the transparent and/or translucent portions of the decorative structure, avoiding in particular a darker area at the periphery of the movement 6. It should be noted that the external surface of the annular portion 17*b*, supporting the movement 6, is advantageously polished so as to be reflective.

The invention claimed is:

1. A watch-comprising:

a case;

a movement incorporated in the case;

a first glass-forming at least in part a back of the case and generally extending in a general plane which is perpendicular to a central axis of the case;

a decorative structure-visible axially on a side of a front face of the watch and comprising at least one transparent and/or translucent portion visible axially through said first glass;

a light source; and a mirror, the light source being arranged so as to emit substantially in the direction of said general plane, the mirror being arranged below the light source and below a rear surface of the decorative structure, the light source and the mirror being arranged so that the mirror receives a major part of the light energy emitted by the light source, when the light source is active, and reflects the light originating from the light source so that the reflected light is at least partially incident on the rear surface of the decorative structure in at least one area defined by said at least one transparent and/or translucent portion and then passes through said at least one transparent and/or translucent portion.

2. The watch according to claim 1, wherein the mirror is arranged so as to reflect light originating from the light source directly towards said at least one area of the rear surface of the decorative structure.

3. The watch according to claim 1, wherein the mirror is formed by a reflective surface which is configured so that the light reflected by the mirror and incident on said at least one area of the rear surface of the decorative structure is substantially uniform.

4. The watch according to claim 3, wherein the reflective surface of the mirror is configured as a function of a non-circular emission surface of the light source.

5. The watch according to claim 3, wherein said reflective surface is configured so that said reflected light is incident on said at least one area of the rear surface of the decorative structure.

6. The watch according to claim 1, wherein the light source has a main emission axis which is parallel to said central axis; and in that the mirror is axially aligned with the light source.

7. The watch according to claim 6, wherein said main emission axis of the light source is coincident with said central axis of the case of the watch.

8. The watch according to claim 1, further comprising a second glass arranged on the side of the front face of the watch, the second glass being located above the movement and the decorative structure.

9. The watch according to claim 1, wherein said at least one transparent and/or translucent portion is arranged at a periphery of the movement.

10. The watch according to claim 9, wherein said light source is axially superimposed on the movement.

11. The watch according to claim 10, wherein the mirror is covered axially, on the side of the front face of the watch, by at least one opaque portion.

12. The watch according to claim 9, wherein said mirror is a first mirror arranged, relative to said at least one transparent and/or translucent portion of the decorative structure, radially on a side of the movement; and wherein the watch further comprises at least one second mirror which is arranged radially on a side opposite to that of the first mirror relative to said at least one transparent and/or translucent portion of the decorative structure.

13. The watch according to claim 12, wherein said at least one second mirror is formed by a part incorporated in the case of the watch and arranged, relative to said central axis, radially beyond the edge of a bearing surface of the back on which the first glass rests.

14. The watch according to claim 13, wherein said at least one second mirror is defined by at least one internal surface of a middle and/or of said back or of a metal portion of the case forming the back and a middle.

15. The watch according to claim 12, wherein said at least one second mirror is configured so that incident light originating from the first mirror is reflected so as to reach directly at least one region of said at least one area which does not directly receive light reflected by the first mirror.

16. The watch according claim 12, wherein a reflective layer is deposited over the internal surface of the first glass at a periphery of the mirror.

17. The watch according to claim 16, further comprising, at a periphery of the light source and opposite said reflective layer, a reflective structure located at a rear of the movement or forming a rear portion of the movement.

18. The watch according to claim 17, wherein the reflective structure is formed by a metal plate arranged against the movement.

* * * * *